Sept. 29, 1942.  J. L. WEAVER  2,297,116
TWO CYCLE SUPERCHARGED OPPOSED GAS ENGINE
Filed Sept. 9, 1940  3 Sheets-Sheet 1
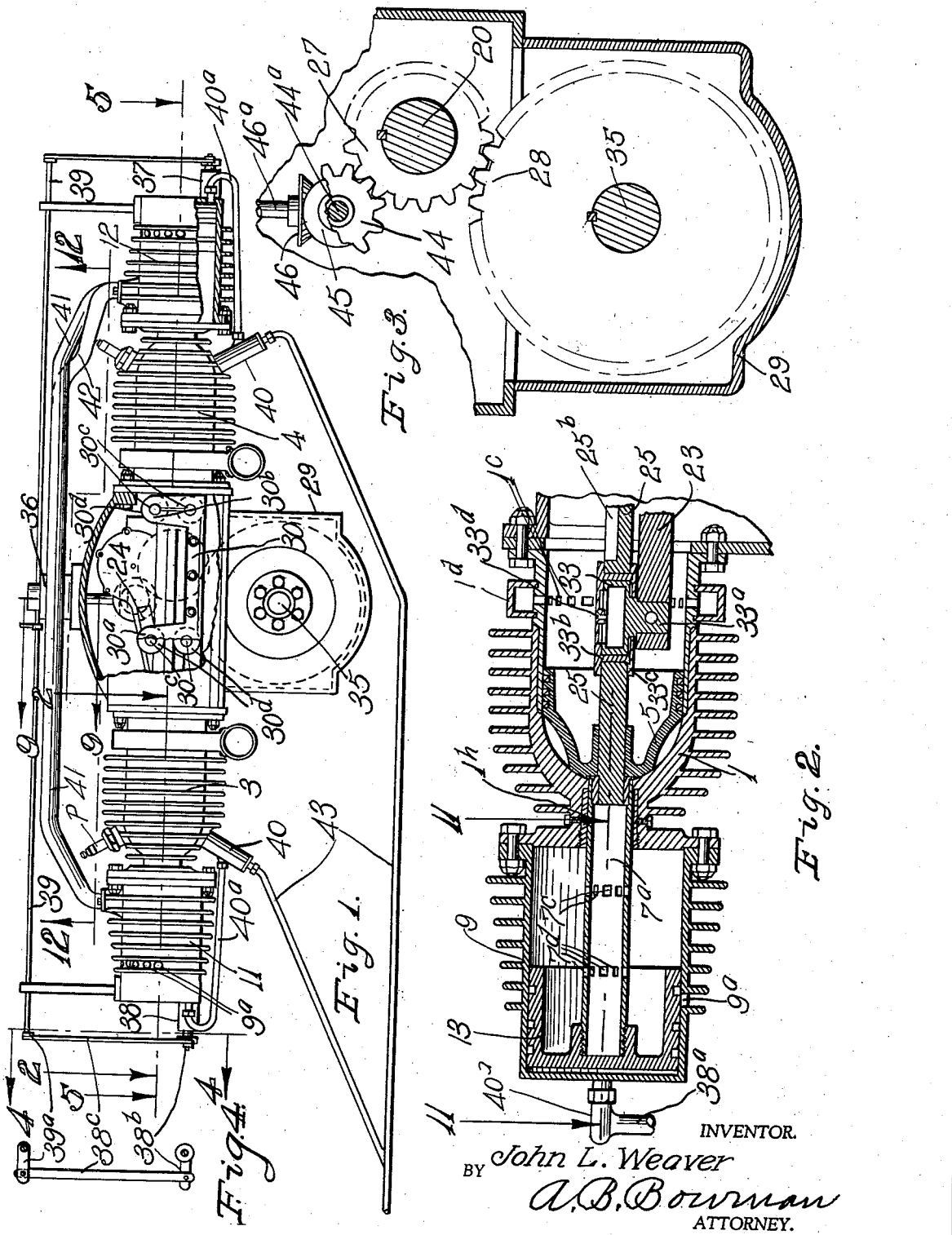
INVENTOR.
John L. Weaver
BY A. B. Bowman
ATTORNEY.

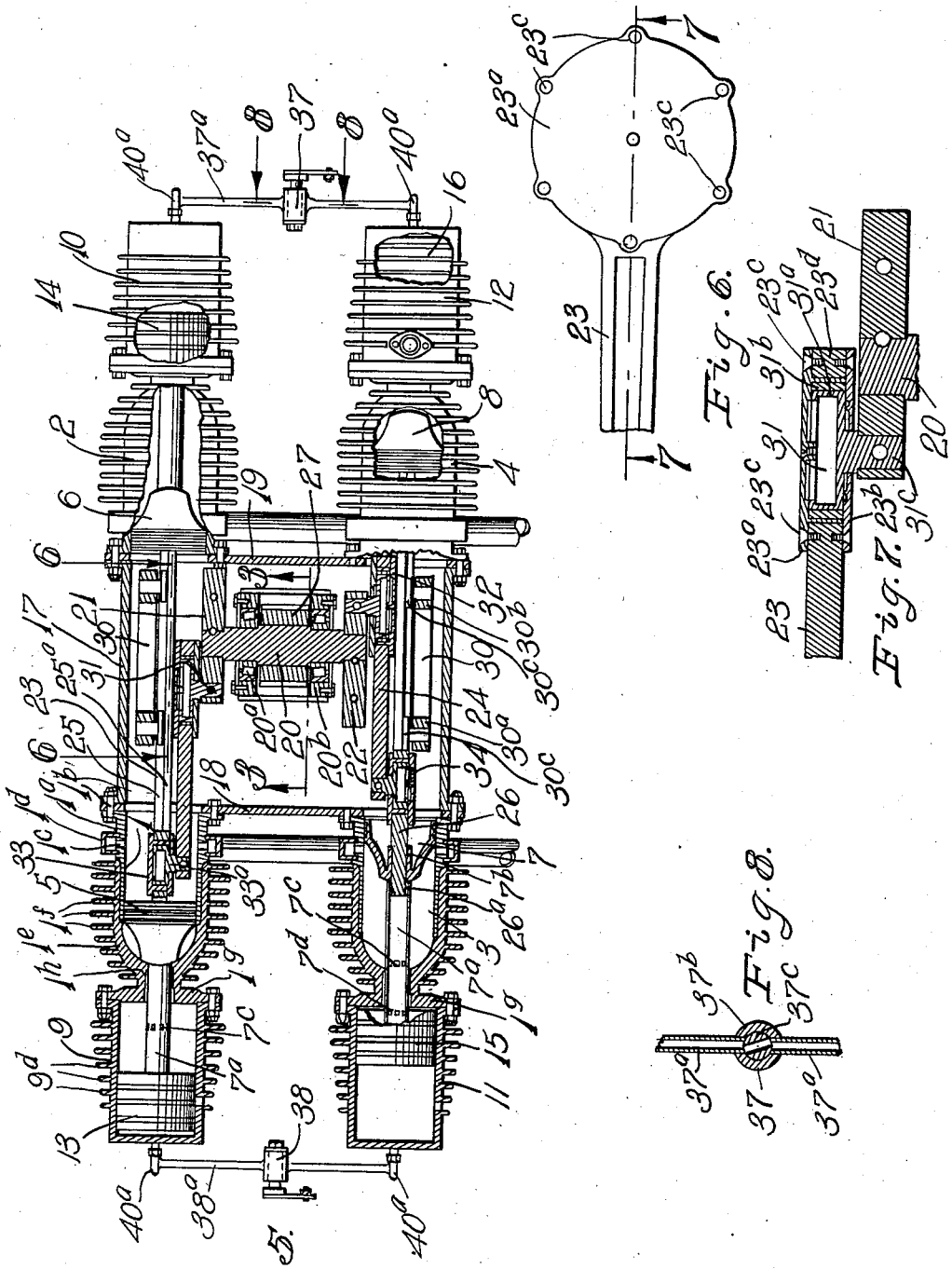

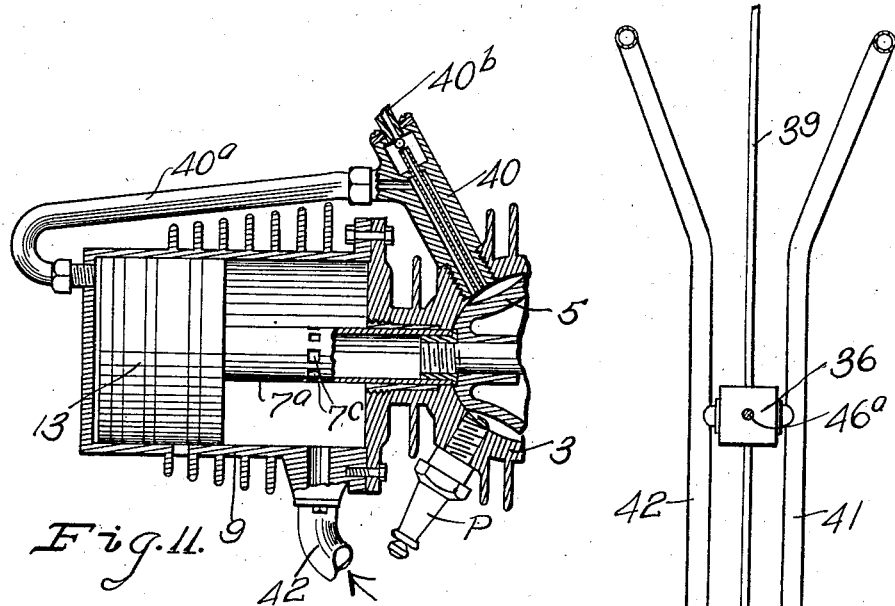
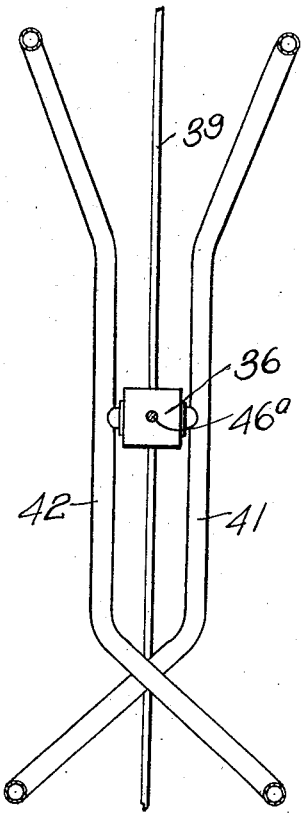
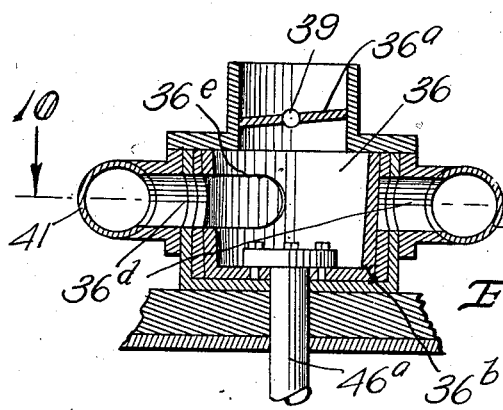
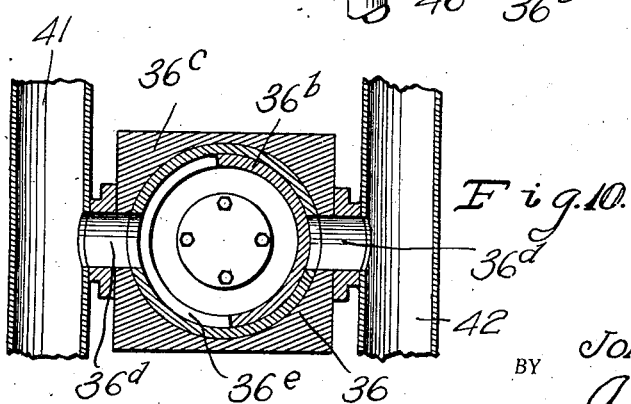

Patented Sept. 29, 1942

2,297,116

UNITED STATES PATENT OFFICE 2,297,116

TWO CYCLE SUPERCHARGED OPPOSED GAS ENGINE

John L. Weaver, San Diego, Calif.

Application September 9, 1940, Serial No. 355,899

8 Claims. (Cl. 123—56)

My invention relates to gas engine of the two cycle supercharged opposed type and the objects of my invention are:

First, to provide a means for efficiently scavenging the explosion cylinders of the two cycle gas engine;

Second, to provide novel supercharging means for the explosion cylinders of two cycle gas engines;

Third, to provide an engine with opposed cylinders, each cylinder having a main explosion cylinder and a fuel air preparing and supercharging cylinder;

Fourth, to provide a two cycle gas engine of this class in which pump cylinders operate to completely scavenge the explosion cylinders while injectors are employed to supply fuel to said explosion cylinders so that the explosion cylinders are completely scavenged and supplied with fresh air before said fuel is injected into said explosion cylinders;

Fifth, to provide a double opposed supercharged engine of this class with novel cooperating connection means;

Sixth, to provide a gas engine of this class with novel lubrication means;

Seventh, to provide a gas engine of this class with novel connecting rod means;

Eighth, to provide a gas engine of this class with novel stabilizing means in connection with the piston rods for the purpose of carrying the load or counter thrust of the piston rod which is normally carried by the piston bearing against the cylinder wall;

Ninth, to provide a gas engine of this class with stabilizing means which serves for keeping the piston rod rigid and free from deflection;

Tenth, to provide a novel means of controlling the flow of fluid from the pump cylinders which permits more rapid acceleration of the engine, great flexibility of speed, great turbulence and agitation of the fluid in the pump cylinders;

Eleventh, to provide a novel combined supercharging and injector means for two cycle gas engines;

Twelfth, to provide a novel scavenging means for two cycle gas engines; and

Thirteenth, to provide an engine of the two cycle opposed type that is very simple and economical of construction, very efficient in proportion to its size and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a side elevational view of my engine showing portions broken away and in section to facilitate the illustration; Fig. 2 is an enlarged sectional view taken from the line 2—2 of Fig. 1 showing the obscured cylinder thereof and showing some of the parts and portions in elevation to facilitate the illustration; Fig. 3 is an enlarged sectional view taken from the line 3—3 of Fig. 5; Fig. 4 is a sectional view from the line 4—4 of Fig. 1; Fig. 5 is a sectional view taken from the line 5—5 of Fig. 1 showing some of the parts and portions in elevation to facilitate the illustration and showing some parts broken away; Fig. 6 is a fragmentary enlarged sectional view taken from the line 6—6 of Fig. 5; Fig. 7 is a fragmentary sectional view taken from the line 7—7 of Fig. 6; Fig. 8 is a fragmentary sectional view taken from the line 8—8 of Fig. 5; Fig. 9 is an enlarged fragmentary sectional view taken from the line 9—9 of Fig. 1; Fig. 10 is a fragmentary sectional view taken from the line 10—10 of Fig. 9; Fig. 11 is a fragmentary sectional view taken from the line 11—11 of Fig. 2 and Fig. 12 is a fragmentary sectional view taken from the line 12—12 of Fig. 1.

Similar characters of reference refer to similar parts and portions throughout the several views of the drawings:

The explosion cylinders 1 to 4 inclusive, the explosion pistons 5 to 8 inclusive, pump cylinders 9 to 12 inclusive, pump cylinder pistons 13 to 16 inclusive, casing members 17, 18 and 19, crank shaft 20, crank members 21 and 22, connecting rods 23 and 24, main piston rods 25 and 26, pinion 27, gear 28, gear housing 29, stabilizer brackets 30, crank shaft throw pins 31 and 32, wrist pins 33 and 34, main shaft 35, air intake control valve 36, injector by-pass valves 37 and 38, valve control shaft 39, injectors 40, air intake manifolds 41 and 42, fuel supply conductor 43 and the valve operating gears 44, 45 and 46 constitute the principal parts and portions of my gas engine.

The explosion cylinders 1 and 2 are positioned in spaced opposed relation to each other, as shown best in Fig. 5 of the drawings, and secured in such spaced relation by means of the casing member 17. The explosion cylinders 3 and 4 are also positioned in opposed relation and are secured in the same manner by the casing member 17 and they are supported in their spaced relation to each other by means of the casing members 18 and 19 which form the end walls of the casing member 17, all as shown best in Fig. 5 of the drawings. These explosion cylinders 1 to 4 inclusive are all constructed alike. Therefore the explosion cylinder 1 only will be described in detail. The explosion cylinder 1 consists of a main cylinder portion 1a which is provided with outwardly extending flanges by which it is secured to the casing members 18 and 17 by means of bolts 1b. It is provided with ports 1c which are the exhaust ports, which exhaust ports are surrounded by an exhaust manifold 1d. This cylinder 1 is provided with a cylinder head 1e which is provided with air cooling webs 1f. This cylinder head 1e is provided with a large flange 1g and with a central opening in its head 1h in which is mounted a bearing for the piston tube 7a. Secured to the flange 1g at its periphery is a pump cylinder 9. The flange 1g forms one end of the pump cylinder 9.

Mounted in the cylinders 1 to 4 inclusive are the explosion pistons 5 to 8 inclusive and mounted in the pump cylinders 9 to 12 inclusive are the pump pistons 13 to 16 inclusive. The explosion piston 7 and pump piston 15 being in section and in detail, as shown in Fig. 5 of the drawings, I will describe these pistons and their connecting tube 7a from the pistons 7 and 15, the other explosion pistons and pump pistons being identical in form and therefore will not be specifically described.

The explosion piston 7 is a hollow piston adapted to fit the explosion cylinder. In this case it is the cylinder 3. It is secured to a connecting rod 26 by means of a boss 7b. This rod 26 extends past the cylinder and is provided with a bushing 26a over which is mounted the piston tube 7a. This piston tube 7a is provided with ports 7c and 7d spaced apart in the tube 7a and when the pistons are in the position shown in Fig. 5 of the drawings, the ports 7d are on one side of the flange 1g and the ports 7c are on the opposite side thereof. Each of the explosion cylinders 1 to 4 inclusive is provided with an ignition spark plug P and an injector 40 mounted in opposed relation with said spark plug in each of said cylinders 1 to 4 inclusive, as shown best in Fig. 11 of the drawings.

Mounted in the casing 17 at right angles to the axis of the cylinders 1 to 4 inclusive and positioned between the cylinders 1 and 2 and 3 and 4, is the crank shaft 20, shown best in Fig. 5 of the drawings, which is journalled in roller bearings 20a which roller bearings are supported in a casing 20b. Secured on the middle portion of said shaft 20 is a pinion 27, shown best in Figs. 3 and 5 of the drawings. This pinion 27 meshes with a gear 28 mounted in the gear casing 29 extending downwardly from the casing 17 and communicating therewith and this gear 28 is mounted on the main shaft 35, which main shaft 35 is journalled in the side walls of said gear casing 29, as shown best in Figs. 1 and 3 of the drawings. Mounted on the extended ends of this crank shaft 20 are the crank members 21 and 22, one at each end, as shown best in Fig. 5 of the drawings. Secured to the crank member 21 is a crank shaft throw pin 31, shown best in Figs. 1, 5 and 6 of the drawings. This crank shaft throw pin 31 is hollow provided with an outer annular surface 31a which serves as a bearing for the floating bearing 31b and it is provided with an extended supporting shaft 31c, which is secured to the crank member 21, shown best in Fig. 6 of the drawings.

Connected with this crank shaft throw pin 31 is a connecting rod 23 which is provided with housing members 23a and 23b which are secured together around the hollow portion of the pin 31 by means of screws 23c shown best in Figs. 6 and 7 of the drawings. The connecting rod 23 is provided with an annular portion 23d which fits in between the housing members 23a and 23b at their periphery. It will be here noted that the housing members 23a and 23b are so constructed and assembled that the hollow throw pin 31 becomes an oil reservoir for lubricating the bearings 31b because when the engine is running the centrifugal force acting on this body of oil builds up a positive pressure for lubrication purposes.

It will be here noted that the pine 32 and its connecting parts with the connecting rod 24 and the crank member 22 are the same as just described relative to the pin 31.

Connected with the opposite end of the connecting rod 23 from the pin 31 is wrist pin 33 which is also hollow like the pin 31 and provided with an extended shaft portion 33a which is secured to the end of the connecting rod 23, shown best in Figs. 2 and 5 of the drawings. This hollow portion is revolubly mounted in housing members 33b and 33c which are connected together by means of screws 33d and are supported in an annular portion of the main piston rod 25. The opposite ends of the main piston rods 25 and 26 connect with the main pistons 6 and 8 respectively, and mounted on the casing 17 and rigidly secured thereto in close relation with the main piston rods 25 and 26 are the stabilizer brackets 30, one for each main piston rod. Inasmuch as they are both alike, one will be described as shown best in Fig. 1 of the drawings, which is provided with upwardly extending ends 30a and 30b in which are mounted four eccentric studs 30c on which are revolubly mounted bearings 30d, and these studs are adapted to turn in the bracket 30 in the end 30a and 30b for adjustment of the bearings 30d so that they may be adjusted to their proper relation so that they ride on opposite sides of the tracks 25a and 25b of the main piston rods 25 and 26. The purpose of this stabilizer is to carry the load or counterthrust of the piston rods 25 and 26 which normally is carried by the pistons bearing against the cylinder walls. This bracket also serves the purpose of keeping the main piston rods rigid and free from deflection.

The pump cylinders 9 and 12 inclusive are secured on the explosion cylinders 1 to 4 inclusive and the pump cylinder pistons 13 to 16 inclusive are positioned in said pump cylinders 9 to 12 inclusive, being connected with the explosion pistons 5 to 8 inclusive in the explosion cylinders 1 to 4 inclusive. Referring particularly to Fig. 2 of the drawings, it will be observed that the explosion piston 7 is interconnected with the pump piston 15 by means of a hollow, tubular member 7a, this tubular member 7a being externally screw threaded at its one end upon which is secured the pump piston 15 providing a rigid connected relation of the pump piston 15 with the explosion piston 7. This tubular member 7a is provided with two annular rows of openings 7c and 7d therein which are positioned in spaced relation to each other and arranged to be positioned at opposite ends of the cylinder openings 1h so that the annular row of openings 7c is positioned in in the explosion cylinder 3, while the annular row of openings 7d is positioned in the pump cylinder 9 in the relation as shown best in Fig. 5 of the drawings. In communicative relation with the interior of each of the pump cylinders 9 to 12 inclusive at the compression end thereof is a hollow tubular conductor member 40a, the pump cylinders 10 and 12 being interconnected by the hollow tubular conductor member 37a and the pump cylinders 9 and 11 being interconnected by the tubular member 38a.

Positioned in communicative relation with each of these conductor tubes 37a and 38a are injector by-pass valves 37 and 38 which are arranged to control the injection pressure created by the compression of the pump pistons in the pump cylinders. The injector by-pass valve 37, as shown in detail in Fig. 8 of the drawings is provided with an outer casing 37b, and a rotatable valve member 37c therein resembling a conventional plug valve. These injector by-pass valves 37 and 38 are both simultaneously operated and controlled by the valve control shaft 39 in connection with the butterfly valve member 36a of the air intake control valve 36. It will be here noted that the valve control shaft 39 extends in opposite directions from the air intake control valve 36 and that each of the injector by-pass valves 37 and 38 are directly connected with the valve control shaft 39 by means of the link and bellcrank arrangement, as shown best in Fig. 4 of the drawings. Each of the injector by-pass valves 37 and 38 is provided with a bell crank member 38b to which is connected a link member 38c pivotally connected to a bell crank member 39a of the valve control shaft 39 providing a simultaneous cooperative action and adjustment of the injector by-pass valves 37 and 38 with the butterfly valve member 36a of the air intake control valve 36.

The air intake control valve 36 is a revoluble barrel valve which is operated by means of the valve gears 44, 45 and 46, as shown best in Figs. 1 and 3 of the drawings. The valve gear 44 being in mesh with the pinions 27, is arranged to revolve the shaft 44a upon which a bevel gear 45 is mounted. This bevel valve gear 45 meshes with a bevel valve gear 46 which is arranged to revolve the shaft 46a which is rigidly connected with the barrel valve member 36b of the air intake control valve 36, as shown best in Figs. 3 and 9 of the drawings. This air intake control valve 36 is provided with a casing member 36c having opposed ports therein designated 36d which are in direct communicative relation with the interior of the air intake manifolds 41 and 42, which manifolds 41 and 42 are in direct communicative relation with the interior of the pump cylinders 9 to 12 inclusive, the intake manifold 42 being in communicative relation with the pump cylinders 9 and 12, while the intake manifold 41 is in communicative relation with the pump cylinders 10 and 11, as shown best in Figs. 1, 11 and 12 of the drawings. The ports 36d are arranged to communicate with the substantially semi-circular slotted portion 36e in the barrel valve member 36b, as shown best in Figs. 9 and 10 of the drawings. It will be here noted that the supply of air to the manifolds 41 and 42 is alternately shut off with the revolution of the barrel valve member 36b with the substantially semi-circular slotted portion 36e therein. While the passage of air is open to one of the manifolds, it is shut off to the other in conformance with the position of the pump pistons in the pump cylinders 9 to 12 inclusive. The intake manifolds 41 and 42 are secured to the pump cylinders in the relation as shown in detail in Fig. 11 of the drawings, each of the pump cylinders 9 to 12 inclusive having a port opening in communicative relation with the interior of one of the manifolds 41 or 42, which port is positioned in the side wall of each of the pump cylinders 9 to 12 inclusive near the explosion cylinder to which each of the pump cylinders 9 to 12 inclusive are secured.

The fuel injectors 40 are conventional fuel injectors and each of the explosion cylinders 1 to 4 inclusive are provided with one of these injectors 40 in the relation as shown best in Fig. 11 of the drawings. Intercommunicating with each of these injectors 40 is an air conductor tube 40a which is arranged to conduct air under pressure from the compression side of each of the pump pistons 13 to 16 inclusive in their respective pump cylinders 9 to 12 inclusive. It will be here noted that the conductor tubes 37a and 38a intercommunicate with the conductor tubes 40a, as shown best in Fig. 5 of the drawings. The fuel line 43 is a conventional hollow tubular fuel conductor member arranged to conduct fuel into the injectors 40, as shown best in Figs. 1 and 11 of the drawings.

The operation of my gas engine is substantially as follows:

The interconnected opposed pistons 5 and 6 and 7 and 8 in their respective explosion cylinder are arranged to reciprocate in opposite direction in their connected relation with the crank shaft 20, each of these explosion cylinders having a pump cylinder in cooperative relation therewith arranged to scavenge air therefrom and also to supply pressure for fuel injection into the explosion cylinder. With the revolution of the crank shaft 20, the pinions 27 operates the valve gears 44, 45 and 46 revolving the barrel valve member 36b in the air intake control valve 36, alternately opening the air passage in communicative relation with the intake manifolds 41 and 42 through which the passage of air is conducted in communicative relation with the interior of the pump cylinders. When the pump piston is in the position as shown in Fig. 2 of the drawings, the compression of air at the top of the piston is conducted to one of the injectors 40 which is in communicative relation with the explosion piston directly connected to said pump cylinder piston. When the explosion cylinder piston and the pump cylinder piston are in the position, as shown in Fig. 2 of the drawings, the injection of fuel through the injector 40 takes place. The spark plug P fires the charge of fuel and the piston passes backwardly in the explosion cylinder until the exhaust openings are passed and the exhaust gases are expelled through the exhaust openings 1c, as shown best in Fig. 5 of the drawings, which exhaust openings 1c are in communicative relation with the exhaust manifold 1d. The pump piston in connection with the explosion piston when at the exhaust position compresses air in the pump cylinder and the air passes inwardly through the opening 7d to the interior of the tube 7a outwardly through the opening 7c and into the explosion cylinder causing forceful scavenging of the exhaust gases from the explosion cylinder through the exhaust opening 1c providing complete and very efficient removal of the exhaust gases from the explosion cylinder, replacing said exhaust gases with fresh air which is compressed upon the return stroke of the explosion piston which return stroke of the explosion piston carries the pump piston in a corresponding direction causing an intake of fresh air following the pump piston into the pump piston cylinder, through either of the intake manifolds 41 or 42, as the case may be. It will be noted that the barrel valve member 36b is so timed and arranged that the slotted portion 36e is in communicative relation with the manifold connected to the pump cylinder in which the intake stroke of the pump cylinder piston is being performed. During the intake stroke of the pump cylinder piston, the openings 7c in the hollow tube 7a are past the end of the openings in the explosion cylinder head so that a vacuum arises following the pump cylinder piston for the intake of fresh air. Each of the pump cylinders 9 to 12 inclusive are provided with a row of port openings 9a therein near the compression end thereof which provides for the intake of air at the top compression side of the piston for use in supplying compressed air to the fuel injectors 40, all as shown best in Fig. 2 of the drawings. The valve control shaft 39 in connection with the butterfly member 36a of the air intake control valve 36 is arranged to operate the injector by-pass valves 37 and 38 in proportionate relation to the amount of air being admitted through the air intake control valve 36 synchronizing the operation and control of injection air pressure into the injectors 40 through the air intake control valve 36 in communicative relation with the intake manifolds 41 and 42.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a two cycle supercharged opposed gas engine of the class described, oppositely disposed explosion cylinders, pistons reciprocally mounted therein and connected together, pump cylinders connected to said explosion cylinders in axial alignment therewith outwardly of said explosion cylinders, pistons reciprocally mounted in said pump cylinders and tubular connecting means between said pistons in said pump cylinders and said pistons in said explosion cylinders, said pump cylinders provided with intake openings in their side walls, injector air conductor tubes in communicative relation with the outer ends of said pump cylinders, and fuel injectors in communicative relation with said explosion cylinders and connected with said injector air conductor tubes.

2. In a two cycle supercharged opposed gas engine of the class described, oppositely disposed explosion cylinders, pistons reciprocally mounted therein and connected together, pump cylinders connected to said explosion cylinders in axial alignment therewith outwardly of said explosion cylinders, pistons reciprocally mounted in said pump cylinders and tubular connecting means between said pistons in said pump cylinders and said pistons in said explosion cylinders, said pump cylinders provided with intake openings in their side walls, injector air conductor tubes in communicative relation with the outer ends of said pump cylinders, fuel injectors in communicative relation with said explosion cylinders and connected with said injector air conductor tubes, and intake manifold means and air intake control valve means in communicative relation with said intake openings in the side walls of said pump cylinders.

3. In a gas engine of the class described, the combination of explosion cylinders and pump cylinders with pistons therein, a crank shaft, connecting rod means for said crank shaft and said pistons, a housing for said crank shaft, a pinion centrally of said crank shaft, valve gear means operatively connected with said pinion and an air intake control valve in operative connection with said valve gear means.

4. In a gas engine of the class described, the combination of explosion cylinders and pump cylinders with pistons therein, a crank shaft, connecting rod means for said crank shaft and said pistons, a housing for said crank shaft, a pinion centrally of said crank shaft, valve gear means operatively connected with said pinion and an air intake control valve in operative connection with said valve gear means, said air intake control valve provided with a revoluble valve member therein and opposed ports in communicative relation with said revoluble valve member.

5. In a gas engine of the class described, the combination of explosion cylinders and pump cylinders with pistons therein, a crank shaft, connecting rod means for said crank shaft and said pistons, a housing for said crank shaft, a pinion centrally of said crank shaft, a valve gear means operatively connected with said pinion, an air intake control valve in operative connection with said valve gear means, said air intake control valve provided with a revoluble valve member therein and opposed ports in communicative relation with said revoluble valve member, and manifolds in communicative interconnected relation with said ports and said pump cylinders.

6. In a two cycle supercharged opposed gas engine of the class described, the combination of oppositely disposed explosion cylinders, pistons reciprocally mounted therein and connected together, pump cylinders connected to said explosion cylinders in axial alignment therewith outwardly of said explosion cylinders, pistons reciprocally mounted in said pump cylinders, tubular connecting means between said pistons in said pump cylinders and said pistons in said explosion cylinders, said pump cylinders provided with intake openings in their side walls, injector air conductor tubes in communicative relation with the outer ends of said pump cylinders, and injector air by-pass valves in connection with said fuel injector air conductor tubes.

7. In a two cycle supercharged opposed gas engine of the class described, the combination of oppositely disposed explosion cylinders, pistons reciprocally mounted therein and connected together, pump cylinders connected to said explosion cylinders in axial alignment therewith outwardly of said explosion cylinders, pistons reciprocally mounted in said pump cylinders, tubular connecting means between said pistons in said pump cylinders and said pistons in said explosion cylinders, said pump cylinders provided with intake openings in their side walls, injector air conductor tubes in communicative relation with the outer ends of said pump cylinders, injector air by-pass valves in connection with said fuel injector air conductor tubes, and fuel injectors in communicative relation with said explosion cylinders and connected with said injector air conductor tubes.

8. In a two cycle supercharged opposed gas engine of the class described, oppositely disposed explosion cylinders, pistons reciprocally mounted therein and connected together, pump cylinders connected to said explosion cylinders in axial alignment therewith outwardly of said explosion cylinders, pistons reciprocally mounted in said pump cylinders and tubular connecting means between said pistons in said pump cylinders and said pistons in said explosion cylinders, said pump cylinders provided with intake openings in their side walls, injector air conductor tubes in communicative relation with the outer ends of said pump cylinders, fuel injectors in communicative relation with said explosion cylinders and connected with said injector air conductor tubes, intake manifold means and air intake control valve means in communicative relation with said intake openings in the side walls of said pump cylinders, and control means interconnecting said air intake control valve means and said injector by-pass valves.

JOHN L. WEAVER.